United States Patent [19]

Heimbach

[11] Patent Number: 4,682,399

[45] Date of Patent: Jul. 28, 1987

[54] METHOD AND TOOL FOR REMOVING THE NUT WHICH SECURES A FAUCET TO A SINK

[76] Inventor: Glenn A. Heimbach, 287 E. 7th St., Bloomsburg, Pa. 17815

[21] Appl. No.: 820,103

[22] Filed: Jan. 21, 1986

[51] Int. Cl.$^4$ ............................................. B23P 19/02
[52] U.S. Cl. ................................. 29/426.4; 30/272 R
[58] Field of Search ...................... 81/120, 121.1, 122, 81/125, 124.2, 53.2, 441, 177.85, 124.3, 176.15, 176.2; 408/204, 205, 206, 207, 203.5, 1; 30/240, 130, 301, 272, 316, 360; 29/426.4, 240

[56] References Cited

U.S. PATENT DOCUMENTS

| | | | |
|---|---|---|---|
| 1,848,590 | 3/1932 | Willis | 21/53.2 |
| 2,725,766 | 12/1955 | Van Heukelom | 408/204 X |
| 3,950,111 | 4/1976 | Churchwell et al. | 408/204 |
| 4,203,211 | 5/1980 | Quick | 30/360 X |
| 4,261,093 | 4/1981 | Steffen et al. | 29/426.4 |
| 4,365,413 | 12/1982 | Quick | 29/426.4 X |
| 4,432,677 | 2/1984 | Lewis | 408/203.5 |

Primary Examiner—Frederick R. Schmidt
Assistant Examiner—Debra S. Meislin
Attorney, Agent, or Firm—Michael J. Delaney

[57] ABSTRACT

A method of and tool for removing the nut which is in threaded engagement with exterior threads on the inlet end of a faucet to secure the faucet to a sink uses a tool which has at one end a hollow cylindrical portion terminating in cutting teeth and at the other end a reduced portion. The reduced portion is placed within the chuck of a power drill. The hollow cylindrical portion is passed over the threads on the inlet end of the faucet with the cutting teeth in contact with the nut. The tool is rotated by the power drill and the cutting teeth cuts the nut and separates it from the faucet.

1 Claim, 5 Drawing Figures

METHOD AND TOOL FOR REMOVING THE NUT WHICH SECURES A FAUCET TO A SINK

BACKGROUND OF THE INVENTION

This invention relates to a method of and tool for removing a faucet from a sink.

The nut which holds a faucet to a sink is located in a very confined and inaccessible place. The nut is located between the walls of the sink and on the underside of the sink. In addition frequently, the nut becomes corroded and the corrosion products make rotation of the nut next to impossible. Furthermore, the threads of the faucet which engage the nut and the nut itself are often painted and the paint makes it almost impossible to rotate the nut.

To further complicate the problem, the nut is relatively thin, along the lines of a jam nut. Thus, the nut is not easily held by a tool. Furthermore, the nut is made from a material which is easily deformed so that the corners of the nut are easily rounded causing a tool to slip on the nut rather than rotate the nut.

Tools have been provided for removing the nut which holds a faucet to a sink. However, these tools have not been entirely satisfactory and in some cases have not been able to remove the nut due to one or more of the above conditions. In such case, heretofore, the sink had to be removed from its location and turned over to provide better access to the nut in an effort to remove the nut.

SUMMARY OF THE INVENTION

It is an object of this invention to provide an inexpensive method and tool to remove the nut which holds a faucet to a sink.

It is another object of this invention to provide a method and tool which removes the nut which holds a faucet to a sink quickly and with a minimum of effort.

The method and tool of this invention for removing the nut which is in threaded engagement with the exterior threads on the inlet end of a faucet, which is located on the underside of a sink and which secures the faucet to a sink includes a tool having at one end a hollow cylindrical portion terminating in cutting teeth and at the other end a portion which may be gripped by the chuck of a power drill. The hollow cylindrical portion has an inside diameter slightly larger than the outside diameter of the exterior threads on the inlet end of the faucet and a length which is longer than the length of the threaded inlet end of the faucet. With the reduced portion of the tool held by the chuck of a power drill, the hollow cylindrical portion is placed over the threaded inlet of the faucet. The cutting teeth are then forced against the nut while the tool is rotated by the power drill. Within seconds the nut is cut free of the faucet and the faucet may be removed from the sink.

DETAILED DESCRIPTION OF THE DRAWINGS

Figure 1:
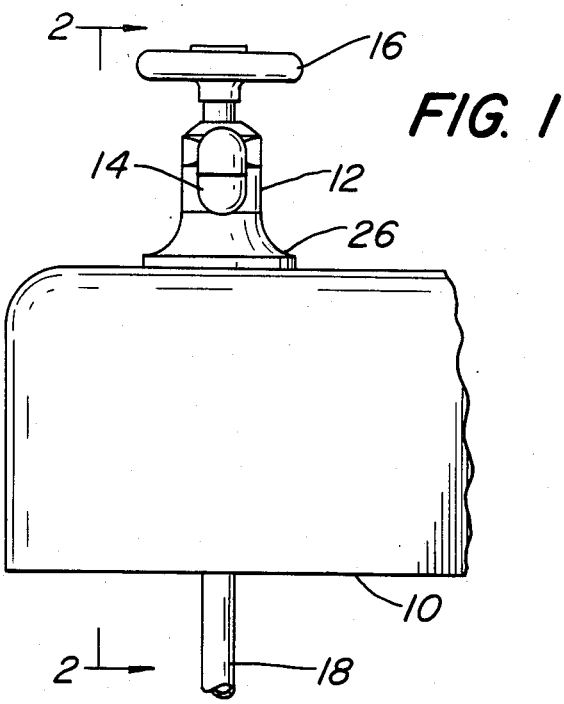
FIG. 1 is a partial elevational view of a sink having a faucet attached thereto.
Figure 2:
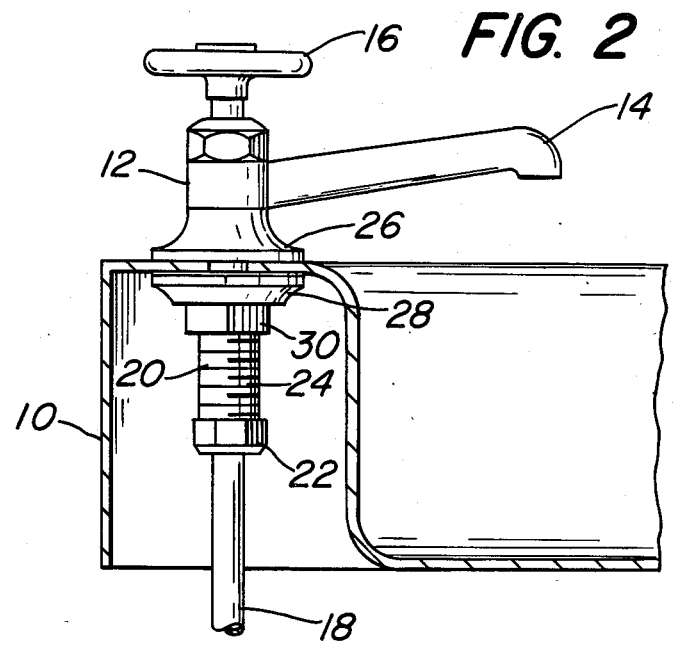
FIG. 2 is a view along the lines 2—2 of FIG. 1.

Referring to FIG. 1, a sink 10 has a faucet 12 attached thereto. The faucet 12 includes the usual spout 14 and an operating handle 16. As shown in FIG. 2, the faucet 12 has a water line 18 attached to its exterior threaded inlet end 20 by means of water line holding nut 22 adapted to receive the water line 18 and to be in threaded engagement with the threads 24 of the faucet inlet end 20. The faucet 12 has its inlet end 20 passing through a hole in the sink 10 with the faucet flange 26 bearing on the top side of the sink 10. A washer 28 is placed over the inlet end 20 and is positioned between the underside of the sink 10 and the top of faucet holding nut 30 which is in threaded engagement with the threaded inlet end 20 of the faucet 12 and acts to secure the faucet 12 to the sink 10.

Figure 4:
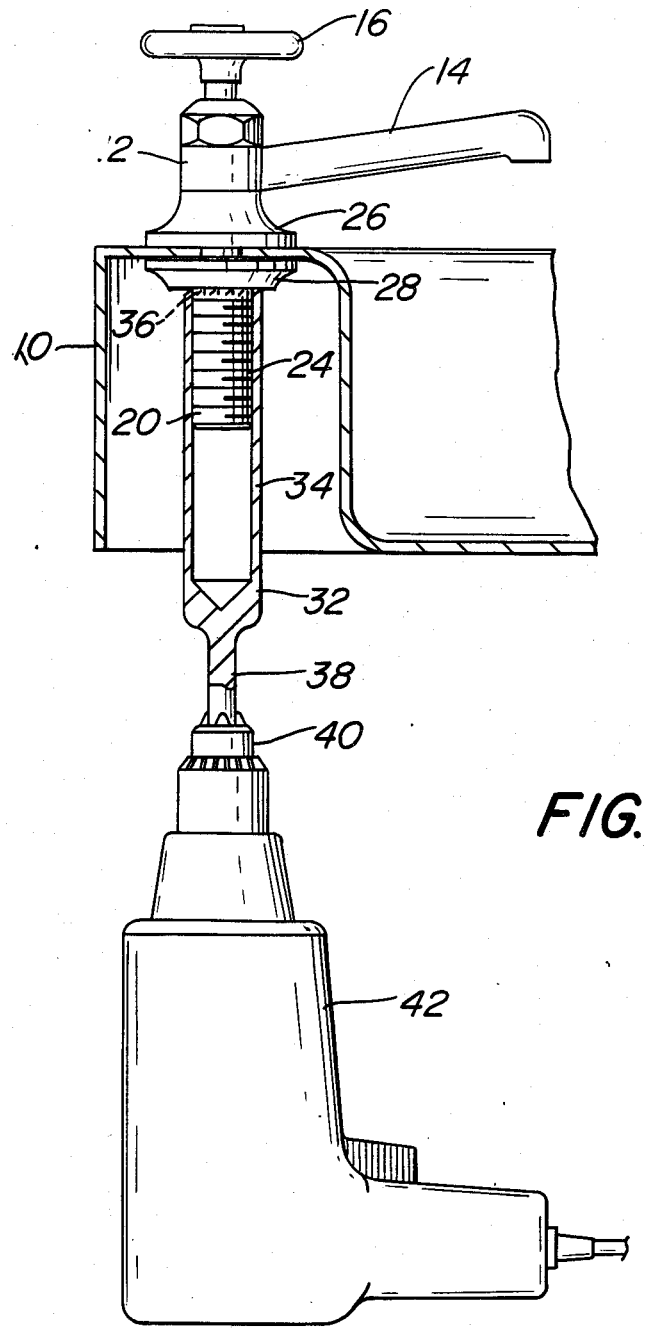
FIG. 4 is an elevational view of the tool of this invention.
Figure 5:
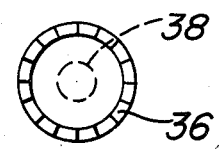
FIG. 5 is an end view of the tool of this invention.
Figure 3:
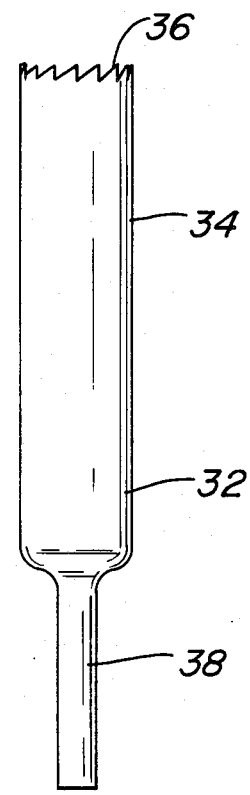
FIG. 3 is a view similar to FIG. 2 showing the tool of this invention in place after the nut which holds the faucet to the sink has been cut from the inlet end of the faucet.

Referring to FIGS. 3, 4 and 5, tool 32 has a hollow cylindrical portion 34 terminating in cutting teeth 36 at one end of the tool 32. At the other end of the tool 32 is a reduced diameter portion 38 which is acceptable to the chuck 40 of a power drill 42. As shown in FIG. 3, the length of the hollow cylindrical portion 34 of tool 32 is longer than the length of the threaded inlet end 20 of the faucet 12. In addition the inside diameter of the hollow cylindrical portion 34 is slightly larger than the outside diameter of the threaded inlet portion 20 of the faucet 12.

When faucet 12 is to removed from a sink 10, the water line 18 is removed from the inlet end 20 of the faucet 12 by removing water line holding nut 22 from threaded inlet end 20 of the faucet 12 after the water flow has been shut off at a remote location, not shown. The reduced diameter solid portion 38 of tool 32 is placed within chuck 40 of power drill 42 and by closing the chuck 40 in a well known manner the tool 32 is held securely within chuck 40. Next, the tool 32 is positioned such that the inlet end 20 of the faucet 12 extends within the hollow cylindrical portion 34 of the tool 32 with the cutting teeth 36 of the tool 32 adjacent the faucet holding nut 30. The tool 32 is then rotated by the power drill 42 while the cutting teeth 36 are forced into contact with the nut 30. The cutting teeth 36 then cuts the nut 30 free from the threaded inlet end 20 of the faucet 12. The faucet 12 can now be lifted upwardly and removed from the sink 10.

SPECIFIC EXAMPLE

It has been found that a tool 32 having the following dimensions operates quickly and easily to cut the nut 30 which holds a faucet 12 to a sink 10 in the manner described above:

Length of hollow cylindrical portion $34 = 4\frac{3}{4}$ inches.
Outside diameter of hollow cylindrical portion $34 = 1$ inch.
Inside diameter of hollow cyldinrical portion $34 = \frac{7}{8}$ inch.
Number of cutting teeth $36 = 18$.
Diameter of reduced portion $38 = \frac{1}{4}$ inch.
Length of reduced portion $38 = 2$ inches.

Although I have described my invention hereinabove in considerable detail, I do not wish to be limited narrowly to the exact and specific particulars disclosed, but I may also use such substitutes, modifications and equivalents as are included within the scope of my invention or pointed out in the appended claims.

I claim:

1. A method of removing the nut which is in threaded engagement with the exterior threads on the inlet end of a faucet, which is located on the underside of a sink and which secures the faucet to the sink comprising:

(a) providing a one piece tool having at one end a hollow cylindrical portion having a substantially constant cross section with a wall section of about 1/16 of an inch terminating in cutting teeth and at the other end a reduced solid portion, said hollow cylindrical portion having an inside diameter slightly larger than the outside diameter of said exterior threads on said inlet end of said faucet and also having a length longer than the length of said exterior threads on said inlet end of said faucet, passing without threaded engagement said hollow cylindrical portion over said exterior threads.

(b) placing said reduced solid portion of said tool within the holding chuck of a power drill and closing said chuck to secure said tool to said chuck, (c) positioning said tool such that said inlet end of said faucet is within said hollow cylindrical portion of said tool, and (d) circularly cutting said nut about a circle adjacent the outside diameter of said exterior threads of said inlet end of said faucet to free said nut from said inlet end of said faucet by forcing said cutting teeth of said tool against said nut while rotating said tool by means of said power drill.

* * * * *